Patented Dec. 14, 1926.

1,610,962

UNITED STATES PATENT OFFICE.

THEODOR H. MITTENDORF, OF CHICAGO, ILLINOIS.

CULTURED-MILK DRINK.

No Drawing.  Application filed February 19, 1926. Serial No. 89,497.

My invention contemplates the provision of a cultured milk drink which will remain free from biochemical deterioration until ready for consumption, but in which the cultures, which give such drinks their palatable and healthful characteristics, are alive and active at the time of consumption.

Heretofore the manufacture and sale of cultured milk drinks has been very limited,—this notwithstanding the existence of a very large demand for such drinks and a practically unlimited supply of raw material from which to make them.

Cultured milk drinks are both palatable and healthful and when available have proven very popular with the purchasing public. Skimmed milk, from which such drinks may be made, goes to waste in large quantities daily in all large milk centers. But heretofore it has been entirely impractical to market cultured milk drinks in significant quantities because (as heretofore supposed) of the inherent incapability of such cultured milk drinks to remain healthful and palatable long enough to permit of anything like general distribution and sale thereof. Cultures, as they have heretofore existed in milk drinks, have always acted continuously to deteriorate the drinks from the time of their manufacture. The deterioration, particularly in its earlier stages, has been slower under refrigeration than at the higher temperatures but has been constant nevertheless. This problem, presented by constant biochemical deterioration, has constituted a practically insurmountable barrier to the general distribution and consumption of cultured milk drinks. It is to the solution of this problem that the present invention is directed.

The present invention provides a milk drink, containing live cultures, which will retain its palatable and healthful characteristics unimpaired for long periods of time. This is possible because of my discovery that, having selected a given strain (or strains) of suitable cultures, I can treat the same in a way such as to hold them alive but attenuated or transfixed (and thus incapable of deteriorating the milk drink biochemically) until immediately prior to consumption,— at which time the attenuation is brought suddenly to an end and the cultures are permitted to function normally and actively as, of course, is desirable at the time of consumption. This state of attenuation to which I have referred may be maintained under all ordinary room and atmospheric temperatures. Generally speaking it is induced by a gas pressure somewhat less than a gas pressure which it is found will destroy the particular cultures employed, and is maintained by gas pressure,—the gas pressure by which the attenuation of the cultures is maintained ordinarily being less than the attenuation-inducing pressure employed.

In manufacturing the milk drink of my invention I preferably employ skimmed milk in pure and unadulterated form. Whole milk may be employed but ordinarily it is not used because of its greater cost. The milk is cultured in the usual way by the introduction of bacteria which will afford the acidity, flavor and therapeutic effects desired. I prefer to employ only a carefully selected strain (or strains) of for instance, *Bacillus bulgaricus*, *Streptococcus lacticus*, *Glycobacter peptelyticus*, or *Bacillus casei*. It is important that the bacteria employed be of carefully selected and cultivated strain or strains in order that uniform results may be secured after the particular technic applicable to bacteria of the selected strain or strains has been established. I have found from experience that bacteria of certain strains may be killed by the application of gas pressures which will serve only to induce others into a state of suspended animation or attenuation. Similarly, gas pressures sufficient to induce bacteria of a given strain or strains into a state of attenuation may be incapable of even temporarily suspending the biochemical activities of bacteria of another strain or strains. By employing only bacteria of carefully selected and cultivated strain or strains, uniform results always may be expected after the attenuating and attenuation maintaining pressures peculiar to such selected strain or strains of bacteria have been determined.

After the milk has been cultured by the introduction of a carefully selected and cultivated strain, or strains, of bacteria, as above stated, its temperature is preferably lowered to substantially 38° Fahrenheit and it is agitated for about five minutes in a closed chamber which is connected with a suction pump, or other vacuum producer, capable of maintaining a vacuum of from eighteen to twenty-eight inches of mercury in the tank during the agitating operation.

This agitation of the cultured milk in vacuo very greatly reduces its gaseous contents and also serves to remove certain impurities. After such agitation in vacuo carbon dioxide is admitted to the closed chamber to perform a two-fold function, that is, firstly, to carbonate the cultured milk, and secondly, and more important, to induce the bacteria contained in the milk into a practically perfect state of attenuation, or suspended animation, without killing them. In order to induce this state of attenuation, the carbon dioxide should be applied at a pressure somewhat less than the least pressure which experience has shown to be capable of destroying bacteria of the particular strain or strains employed. Since the degree of pressure necessary to kill or produce attenuation will vary with the particular strain or strains of bacteria employed, only illustrative pressures are given in this specification. For instance, if by trial it is found that carbon dioxide applied at 38° Fahrenheit and at forty pounds pressure is barely sufficient to destroy the bacteria of the particular strain or strains employed, then a pressure of for instance from thirty-five to thirty-eight pounds, applied at the same temperature, reasonably may be expected to induce the proper state of attenuation. Generally speaking, the pressures necessary to destroy or attenuate the bacteria vary inversely as the temperature at which the pressure is applied.

The attenuation inducing pressure (whatever it may be determined to be in the case of the particular bacteria employed) is preferably maintained upon the cultured milk for several hours. The gas pressure is then reduced to a lower pressure which, in the case of the particular strain or strains of bacteria employed, will have been found sufficient to maintain the state of attenuation induced by the greater pressure above mentioned. The carbonated cultured milk is now bottled, or otherwise confined and hermetically sealed, under this attenuation-maintaining pressure. Ordinary bottling pressures (of from a fraction of a pound to fifteen pounds) are usually sufficient to maintain the bacteria in the requisite state of attenuation. It is a peculiar, but nevertheless demonstrated fact that after inducing the bacteria into a state of attenuation by a relatively high pressure of $CO_2$ they may be retained in that state of attenuation for long periods of time by $CO_2$ under an ordinary bottling pressure. Furthermore when the attenuation-maintaining pressure is removed, as by the opening of a bottle, the bacteria instantly resume their biochemical activities with full vigor.

It will be understood, of course, that I may color, and/or sweeten my cultured milk product in any way and at any time during the course of its manufacture. The present invention is not particularly concerned with these details of the general process and no further reference to them will be made in this specification.

Cultured milk drinks were of course known prior to my invention. Carbonated milk drinks were also well known. Furthermore, it is entirely possible (although I know of no instance) that cultured milk drinks were carbonated prior to my invention. However, the product of my present invention is not merely a carbonated cultured milk drink. A cultured milk drink which is merely carbonated will not have its keeping quality improved to any material extent, if at all. The cultured milk drink which is the product of the present invention will keep perfectly for long periods of time,—for periods of months or many months, whereas cultured milk drinks as heretofore made will keep only for a few hours at ordinary room temperatures and only for a day or more under first class refrigeration.

I believe that I am the first to conceive of the desirability and possibility of inducing the contained bacteria of a cultured milk drink into a state of continuing attenuation by the application of $CO_2$, or other gas under pressure, and of maintaining this state of attenuation for long periods of time by retaining the cultured milk drink under a gas pressure consistent with commercial bottling methods. I also believe that I am the first to produce a cultured milk drink, carbonated or otherwise, which will retain its palatable and healthful characteristics unimpaired for long periods of time under ordinary temperatures.

The desired pressure can be put upon the milk drink by practically any gas excluding however those gases which will tend to deteriorate or cause chemical decomposition of the various important constituents of the drink. I mean to exclude gases of this character when I use the expression "an inert gas" in the claims.

What I claim as new and desire to secure by Letters Patent of the United States is:

1. As an article of manufacture, a confined and hermetically sealed carbonated milk beverage containing live cultures in a state of attenuation which are adapted to resume their biochemical activities when the pressure thereon is relieved to atmospheric.

2. The method which consists in subjecting a cultured milk product to carbonation at a pressure insufficient to destroy the cultures but sufficient to induce them into a state of attenuation, and then confining and sealing the product under gas pressure.

3. The method which consists in subjecting a cultured milk product to carbonation at a pressure insufficient to destroy the cultures but sufficient to induce them into a state of attenuation, reducing but not removing the gas pressure and bottling at the reduced pressure.

4. The method which consists in gasifying a cultured milk product with an inert gas at a pressure insufficient to destroy the cultures but sufficient to induce them into a state of attenuation and bottling under pressure.

5. The method which consists of carbonating a cultured milk beverage for several hours at a pressure insufficient to destroy the cultures but sufficient to induce the same into a state of attenuation, reducing but not removing the gas pressure and bottling at the reduced pressure.

6. The method which consists in the following steps: agitating a cultured milk product in vacuo, carbonating at a pressure sufficient to induce the cultures into a state of attenuation but insufficient to destroy them and bottling such product under pressure.

7. The method which consists in the following steps: agitating a cultured milk product in vacuo, carbonating at a pressure sufficient to induce the cultures into a state of attenuation but insufficient to destroy them, reducing but not removing the gas pressure and then bottling at the reduced pressure.

In witness whereof, I hereunto subscribe my name this 9th day of February, 1926.

THEODOR H. MITTENDORF.